United States Patent
Philip et al.

(10) Patent No.: US 11,056,972 B2
(45) Date of Patent: Jul. 6, 2021

(54) POWER CONVERTER AND METHOD OF OPERATING THE SAME

(71) Applicant: NXP B.V., Eindhoven (NL)

(72) Inventors: Melaine Philip, Blainville-sur-Orne (FR); Fabien Boitard, Mouans Sartoux (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/881,785

(22) Filed: May 22, 2020

(65) Prior Publication Data
US 2020/0382002 A1 Dec. 3, 2020

(30) Foreign Application Priority Data

Jun. 3, 2019 (EP) .................................... 19305710

(51) Int. Cl.
*H02M 3/07* (2006.01)
*H02M 3/157* (2006.01)
*H02M 1/14* (2006.01)

(52) U.S. Cl.
CPC ............. *H02M 3/157* (2013.01); *H02M 1/14* (2013.01); *H02M 3/07* (2013.01)

(58) Field of Classification Search
None
See application file for complete search history.

(56) References Cited

U.S. PATENT DOCUMENTS

| | | | |
|---|---|---|---|
| 5,731,731 A * | 3/1998 | Wilcox | H02M 3/158 327/403 |
| 6,055,168 A | 4/2000 | Kotowski et al. | |
| 6,107,862 A | 8/2000 | Mukainakano et al. | |
| 6,169,444 B1 | 1/2001 | Thurber, Jr. | |
| 6,359,797 B1 | 3/2002 | Bayer et al. | |
| 9,385,591 B2 | 7/2016 | Philip | |
| 9,838,086 B2 * | 12/2017 | Dettmann | H04L 63/0428 |
| 2007/0176671 A1 | 8/2007 | Ishida | |
| 2008/0094041 A1 | 4/2008 | Gerber | |
| 2008/0272833 A1 | 11/2008 | Ivanov et al. | |
| 2009/0027022 A1 | 1/2009 | Oyama et al. | |
| 2011/0084675 A1 * | 4/2011 | Kawagoshi | H02M 3/07 323/282 |
| 2015/0061616 A1 | 3/2015 | Cheng et al. | |
| 2018/0013342 A1 | 1/2018 | Cherniak et al. | |

OTHER PUBLICATIONS

Kosev, Josif et al.; "12V-to-15V PWM-Regulated Switched-Capacitor DC-To-DC Voltage Converter," Faculty of Electrical Engineeing, Ss. Cyril and Methodius University, Skope, North Macedonia; Unable to locate publication date; Downloaded from the Internet May 22, 2020 [12V to 15V PWM-Regulated Switched Capacitor Dc to Dc Voltage Converter].

* cited by examiner

*Primary Examiner* — Thomas J. Hiltunen (57) ABSTRACT

In accordance with a first aspect of the present disclosure, a power converter is disclosed, comprising: an input configured to receive an input voltage; an output configured to provide an output voltage; a power switching block coupled between the input and the output; a controller configured to control the power switching block, wherein the controller is configured to open and close switches comprised in the power switching block, wherein the controller is further configured to control a resistance of the power switching block. In accordance with a second aspect of the present disclosure, a corresponding method of operating a power converter is conceived.

18 Claims, 11 Drawing Sheets

POWER CONVERTER AND METHOD OF OPERATING THE SAME

CROSS-REFERENCE TO RELATED APPLICATIONS

This application claims priority under 35 U.S.C. § 119 to European Patent Application No. 19305710.6, filed on Jun. 3, 2019, the contents of which are incorporated by reference herein.

TECHNICAL FIELD

The present disclosure relates to a power converter. Furthermore, the present disclosure relates to a corresponding method of operating a power converter.

BACKGROUND

Power converters have different uses. For example, a power converter may be used in a near field communication (NFC) device, to convert a voltage received from a front-end circuit to a voltage that can be provided to a secure element comprised in such a device. It is important that a power converter operates in a reliable manner.

SUMMARY

In accordance with a first aspect of the present disclosure, a power converter is disclosed, comprising: an input configured to receive an input voltage; an output configured to provide an output voltage; a power switching block coupled between the input and the output; a controller configured to control the power switching block, wherein the controller is configured to open and close switches comprised in the power switching block; wherein the controller is further configured to control a resistance of the power switching block.

In an embodiment, the controller is configured to control said resistance by controlling an on-state resistance of the switches comprised in the power switching block.

In an embodiment, the controller is configured to increase the resistance if a load on the output is low and to decrease the resistance if the load on the output is high.

In an embodiment, the controller is configured to determine that the load on the output is low by determining that the output voltage exceeds a high threshold and to determine that the load on the output is high by determining that the output voltage falls below a low threshold.

In an embodiment, the controller comprises a finite state machine configured to enable or disable the power switching block in response to digital control signals.

In an embodiment, the controller is configured to use pulse width modulation for controlling the resistance of the power switching block.

In an embodiment, the controller comprises a set-reset gate configured to provide a pulse width modulation clock.

In an embodiment, the controller is configured to initiate an increase of the resistance if the output voltage exceeds a targeted set point after half a switching period.

In an embodiment, a near field communication device comprises a power converter of the kind set forth.

In an embodiment, the power converter is configured to provide the output voltage to a secure element comprised in the near field communication device.

In an embodiment, the near field communication device further comprises a front-end circuit configured to provide the input voltage.

In accordance with a second aspect of the present disclosure, a method of operating a power converter is conceived, the power converter comprising an input, an output, a controller and a power switching block coupled between the input and the output, the method comprising: receiving an input voltage on the input; providing an output voltage on the output; controlling, by said controller, the power switching block by opening and closing switches in the power switching block; and controlling, by said controller, a resistance of the power switching block.

In an embodiment, said resistance is controlled by controlling an on-state resistance of the switches comprised in the power switching block.

In an embodiment, the controller increases the resistance if a load on the output is low and decreases the resistance if the load on the output is high.

In an embodiment, the controller determines that the load on the output is low by determining that the output voltage exceeds a high threshold and determines that the load on the output is high by determining that the output voltage falls below a low threshold.

DESCRIPTION OF DRAWINGS

Embodiments will be described in more detail with reference to the appended drawings, in which.

DESCRIPTION OF EMBODIMENTS

Power converters have different uses. For example, a power converter may be used in a near field communication (NFC) device, to convert a voltage received from a front-end circuit to a voltage that can be provided to a secure element comprised in such a device. It is important that a power converter operates in a reliable manner.

Figure 1:
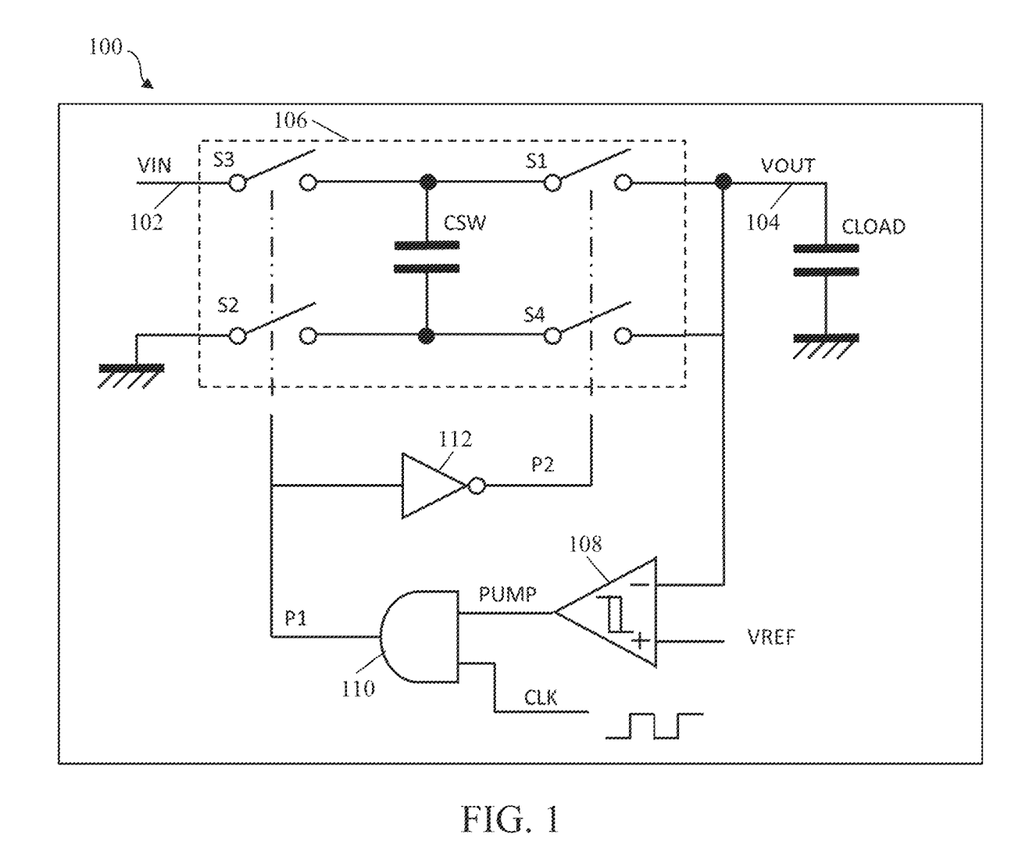
FIG. 1 shows an example of a power converter.

FIG. 1 shows an example of a power converter 100. A so-called buck Switch Mode Power Supply (SMPS) is often used to supply power to a microcontroller in a radio frequency (RF) communication device, in particular in an NFC device. For instance, the buck SMPS may provide power to a secure element (SE). Using a SMPS facilitates reducing the power dissipation and improving the power efficiency. An inductive DC-DC converter of this kind is usually used at a fixed switching frequency, which results in a user-friendly operation in case of RF front-end. However, drawbacks of an inductive SMPS are the bill-of-material (BOM) cost and the footprint, because it requires an external coil. Using a Switching Capacitive Power Converter (SCPC)

instead of an SMPS results in an improvement, because an SCPC uses an external capacitor. An SCPC can use "flying capacitors". These capacitors are charged from the input voltage and then discharged to the load thus providing charge transfer and a constant output voltage.

FIG. 1 shows a basic DC-DC converter of this kind. The power converter 100 comprises an input 102 through which an input voltage VIN is received, an output 104 through which an output voltage VOUT is provided to an external device (not shown) that is represented by a capacitor CLOAD. The power converter comprises a power switching block 106 including a plurality of switches S1, S2, S3, S4 which are coupled to a flying capacitor CSW of the kind set forth. In addition, the power converter 100 comprises a comparator 108, an AND gate 110 and an inverter 112. More specifically, the power switching block 106 includes a first set of switches S1, S2, a second set of switches S3, S4 and the flying capacitor CSW. The first set of switches S1, S2 comprises a switch S1 coupled between the output 104 and the flying capacitor CSW and a switch S2 coupled between the flying capacitor CSW and ground. The second set of switches S3, S4 comprises a switch S3 coupled between the input 102 and the flying capacitor CSW and a switch S3 coupled between the flying capacitor CSW and the output 104. In operation, the switches are controlled in such a way that the first set of switches S1, S2 is closed and the second set of switches S3, S4 is open at a first time instant, and the first set of switches S2, S2 is open and the second set of switches S3, S4 is closed at a second time instant. These steps may then be repeated. Thus, the first set of switches S1, S2 and the second set of switches S3, S4 are closed alternately.

More specifically, the basic DC-DC converter 100 integrates switches and an oscillator so that the switches S1, S2 and S3, S4 work alternately. The configuration shown divides the input voltage by two. This DC-DC converter 100 operates in two phases sequenced by a switching clock. Closing S1 and S2 and leaving S3 and S4 open charges the flying capacitor (CSW) to VOUT in the first half cycle (storing phase). In the second half, the switches S3 and S4 are closed and the switches S1 and S2 are open (loading phase). This action connects the negative terminal of CSW to the output 104 and connects the positive terminal of CSW to the input 102. If the voltage across CLOAD is smaller than that across CSW, charge flows from CSW to CLOAD. The storing phase and the loading phase occur alternately, thereby boosting the output voltage VOUT to its targeted value (VREF). When VOUT reaches VREF, the switching clock is stopped, and then the DC-DC converter 100 stays in the storing phase. As soon as VOUT goes below VREF, the DC-DC converter 100 restarts pumping, alternating the storing and loading phases until VOUT goes above VREF.

Figure 2:
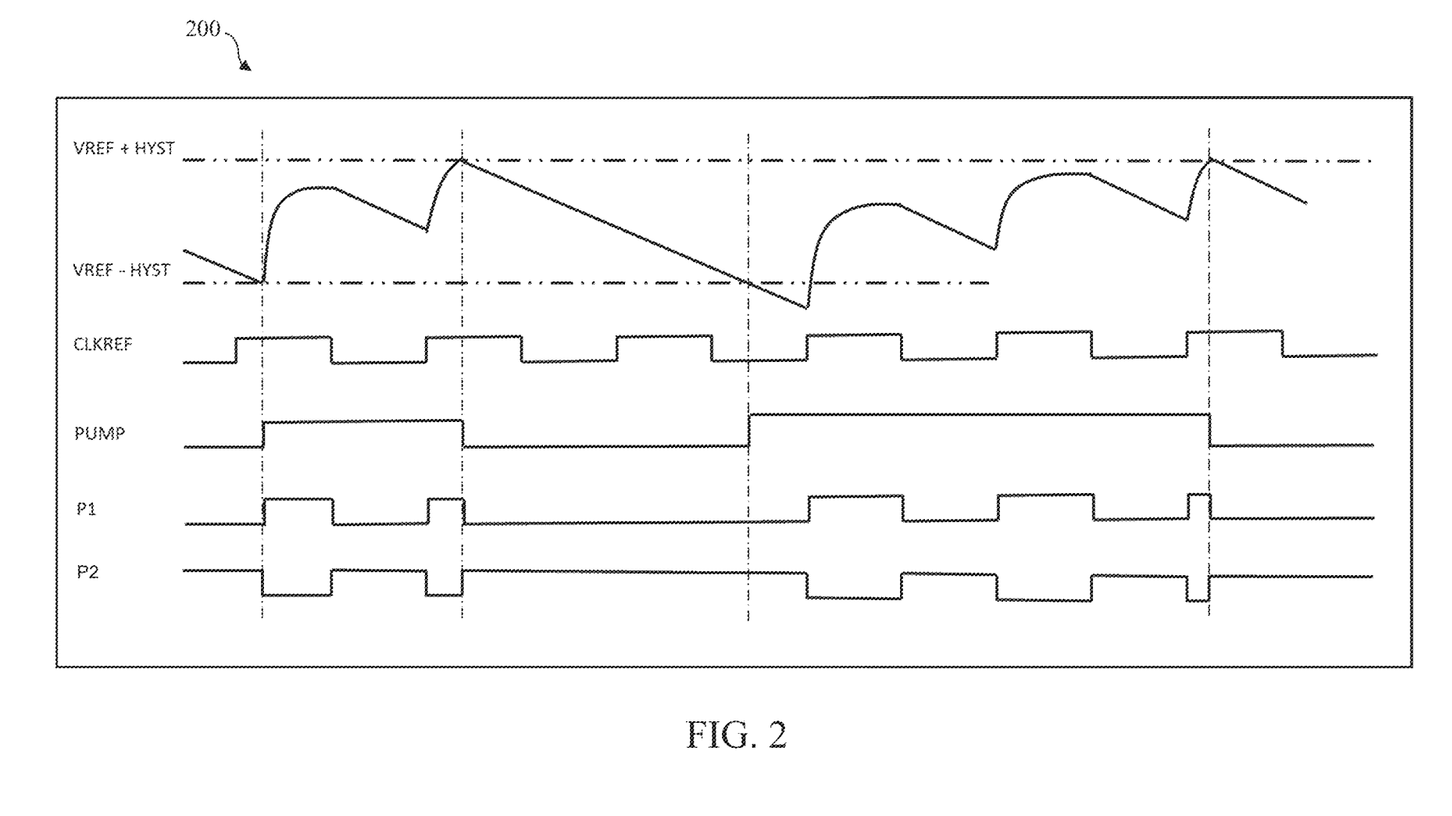
FIG. 2 shows an example of a signal chronogram.

FIG. 2 shows an example of a signal chronogram 200. The output voltage VOUT of the DC-DC converter 100 should be regulated within a voltage window by using a voltage hysteresis (HYST) on the comparator 108. The output voltage VOUT is regulated between VREF and VREF+HYST. The threshold voltage for the VOUT rising edge is VREF+HYST, the threshold voltage for falling edge is VREF. FIG. 2 shows this operation of the converter 100. During startup, the converter 100 pumps energy from VIN to VOUT by alternately closing the switches as explained above, so that the output voltage VOUT rises to VREF+HYST. Then, the converter 100 stops pumping and stays in the storing state. Subsequently, the output voltage VOUT falls linearly due to output load current until VREF, and then the converter 100 restarts boosting the output voltage VOUT to VREF+HYST. However, a drawback of a basic capacitive DC-DC converter 100 of this kind is that the switching frequency is not fixed. In general, the switching frequency in an inverter or converter is the rate at which a switching device is turned on and off. More specifically, in this case, the switching frequency is the rate at which the power switching block is turned on (i.e. pumps the energy) and off (i.e. does not pump energy). This, in turn, may generate sub-harmonic noise, which negatively affects the RF performance. More specifically, the power converter stops pumping once VOUT reaches a high threshold of the hysteretic window. This asynchronous operation leads a low frequency noise on VOUT which depends on the load (i.e. a frequency lower than the input clock). This frequency noise can be seen in the data bandwidth of an RF system. For example, for an NFC application the data bandwidth may be from 100 KHz to 1 MHz (at a carrier frequency of 13.56 MHz); such noise within 100 KHz to 1 MHz may degrade the RF performance.

Figure 3A:
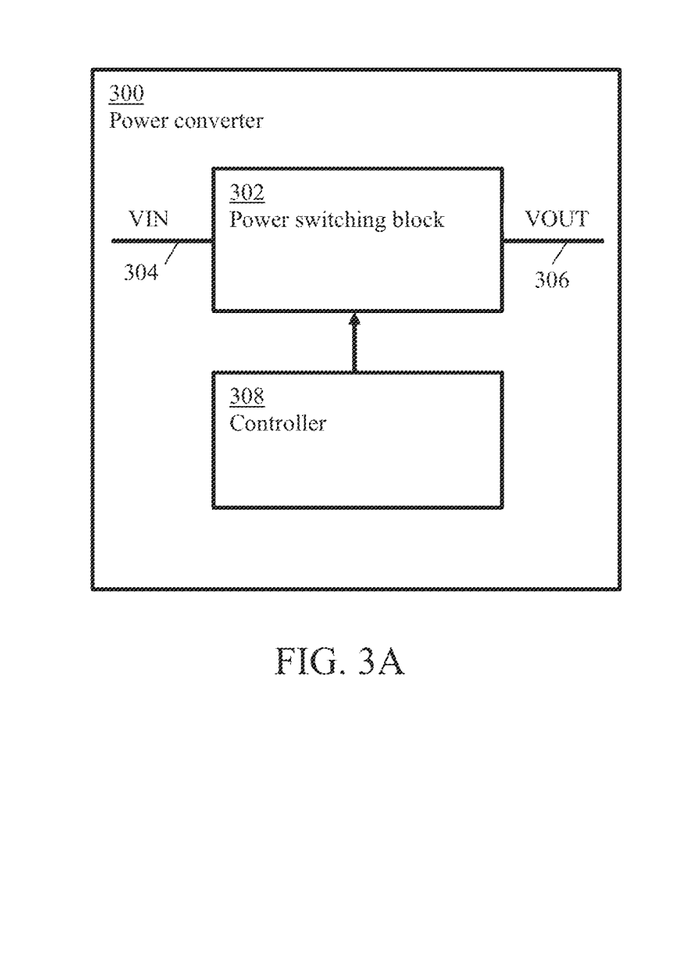
FIG. 3A shows an illustrative embodiment of a power converter.

FIG. 3A shows an illustrative embodiment of a power converter 300. The power converter 300 comprises an input 304, an output 306, a power switching block 302 and a controller 308. The input 304 is configured to receive an input voltage VIN, for example from an RF frond-end circuit (not shown). The output is configured to provide an output voltage, for example to a microcontroller (not shown). The power switching block 302 is coupled between the input 304 and the output 306. The controller 308 is configured to control the power switching block 302, specifically by opening and closing switches in the power switching block 302. In accordance with the present disclosure, the controller 308 is further configured to control a resistance of the power switching block 302. The inventors have found that, by controlling the resistance of the power switching block, the above-mentioned sub-harmonic noise can be reduced. Thus, in this way, the above-mentioned drawback is mitigated. In an embodiment, the controller is configured to control said resistance by controlling an on-state resistance of the switches comprised in the power switching block. In this way, the resistance of the power switching block can easily be controlled. For example, the on-state resistance of an individual switch can be controlled by controlling the gate-to-source voltage (VGS) of field-effect transistors (FETs) comprised in said switch.

Figure 3B:
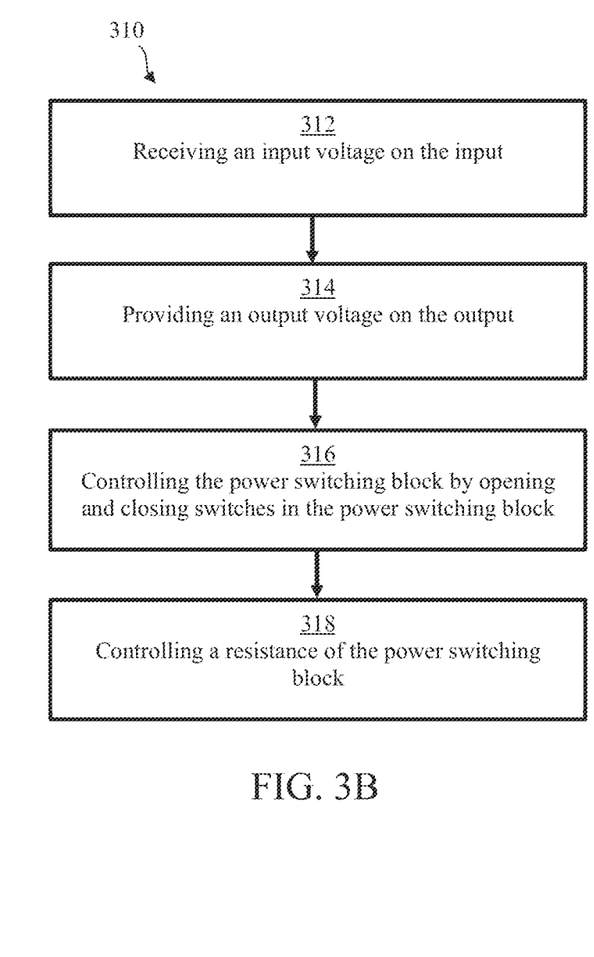
FIG. 3B shows an illustrative embodiment of a method of operating a power converter.

FIG. 3B shows an illustrative embodiment of a method 310 of operating a power converter of the kind set forth. The method 310 comprises, at 312, receiving an input voltage on the input, at 314, providing an output voltage on the output, at 316, controlling the power switching block by opening and closing switches in the power switching block, and at 318, controlling a resistance of the power switching block. As mentioned above, by controlling the resistance of the power switching block, the above-mentioned drawback is mitigated.

Figure 3C:
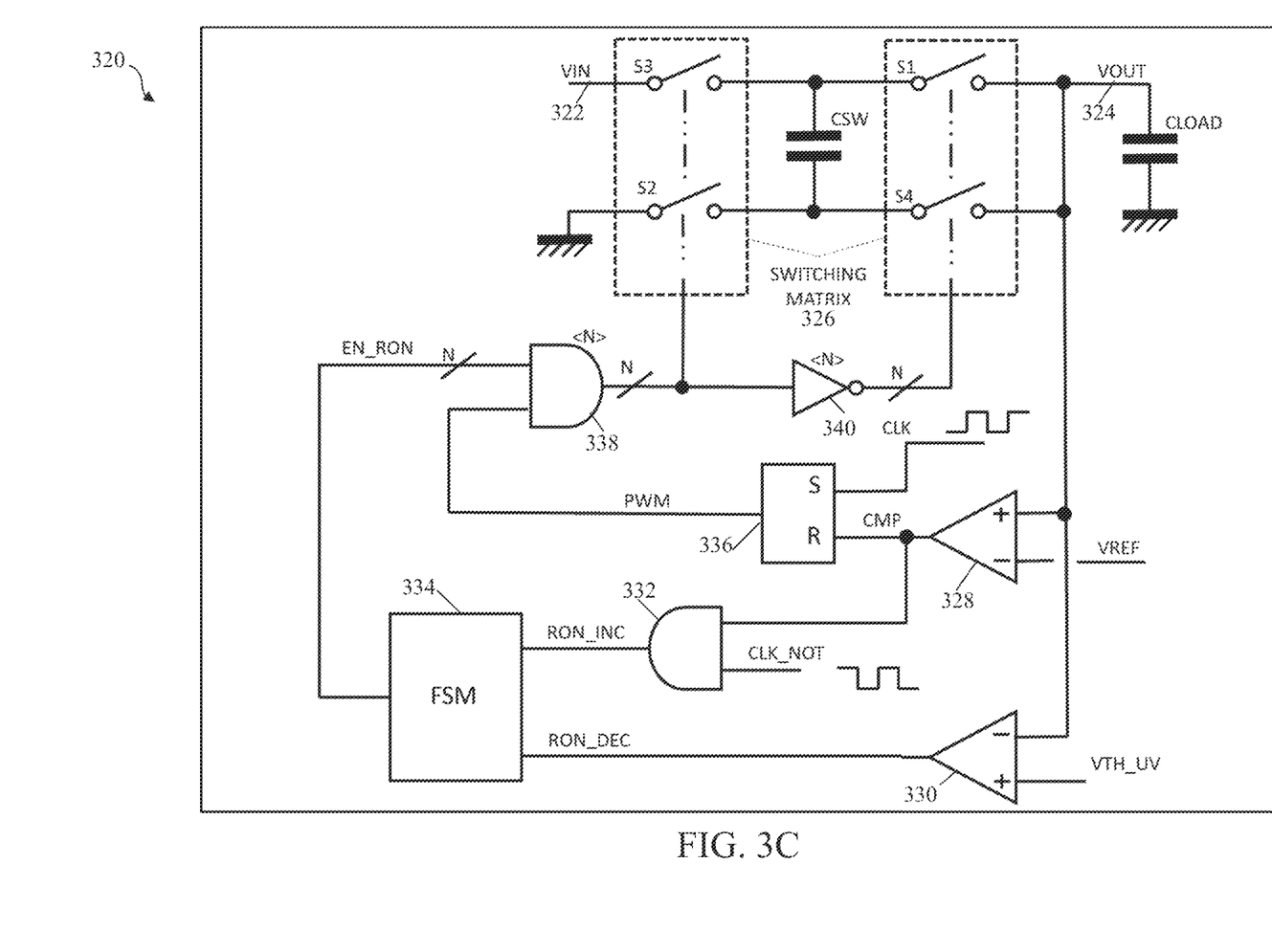
FIG. 3C shows another illustrative embodiment of a power converter.

FIG. 3C shows another illustrative embodiment of a power converter 320. The power converter 320 comprises an input 322, an output 324, a power switching matrix 326 coupled between the input 322 and the output 324 (i.e., a power switching block of the kind set forth), comparators 328, 330, AND gates 332, 338, a finite state machine (FSM) 334, a set-reset gate 336, and an inverter 340. The power converter 320 is an example of a practical and effective implementation of the presently disclosed power converter. The power converter 320 is controlled using Pulse Width Modulation (PWM). Furthermore, the power switching matrix 326 is divided into several parts to control the resistance (RON) in a digital way. Each part may include several switches coupled in parallel. Then, in turn, each switch may include several field-effect transistors (FETs) coupled in parallel. For instance, the first switch S1 may be composed of several FETs coupled in parallel. Then, the on-state resistance (RON) of said switch S1 can be controlled by controlling the number of FETs which are enabled. The other switches S2, S3, S4 may similarly be composed of several FETs coupled in parallel, and may be controlled in the same manner. The on-state resistance (RON) of the power switches is adjusted to maintain the switching frequency fixed. In particular, RON is increased at light load to avoid pulse skipping, and then decreased at high load to avoid overload. Thus, in a practical and effective implementation, the controller—which includes the specific components shown in FIG. 3C, i.e. comparators 328, 330, AND gates 332, 338, finite state machine (FSM) 334, set-reset gate 336, and inverter 340—is configured to increase the resistance if a load on the output is low and to decrease the resistance if the load on the output is high. Thus, the output voltage VOUT is kept within a voltage window. If the low threshold is triggered, RON is decreased to have a higher current capability. If the high threshold is triggered, the switching activity is stopped to avoid an overshoot voltage. Thus, in a practical and effective implementation, the controller is configured to determine that the load on the output is low by determining that the output voltage exceeds a high threshold and to determine that the load on the output is high by determining that the output voltage falls below a low threshold. The resistance RON is increased with a digital method using the main loop comparator. Advantageously, this may be triggered if the output voltage is still above a targeted set point after half a switching period. The resistances of the switches in the power switching matrix 326 are configurable as they are controlled individually by a clock provided through a digital bus. The two comparators 328, 330 sense VOUT versus the output voltage set point (VREF) and the under-voltage threshold (VTH_UHV), respectively. The set-reset gate 336 is configured to provide the PWM clock. The reset signal is provided by the VOUT sense comparator 328. A set is ensured at each clock cycle. The finite state machine 334 is configured to enable or disable the power switch matrix 326 in response to the digital inputs RON_INC and RON_ENC. In particular, the field-effect transistors (FETs) that form the individual switches can be enabled during the on-state of said switches. In that case, the finite state machine 334 can control the number of FETs that are enabled during the on-state.

Figure 4:
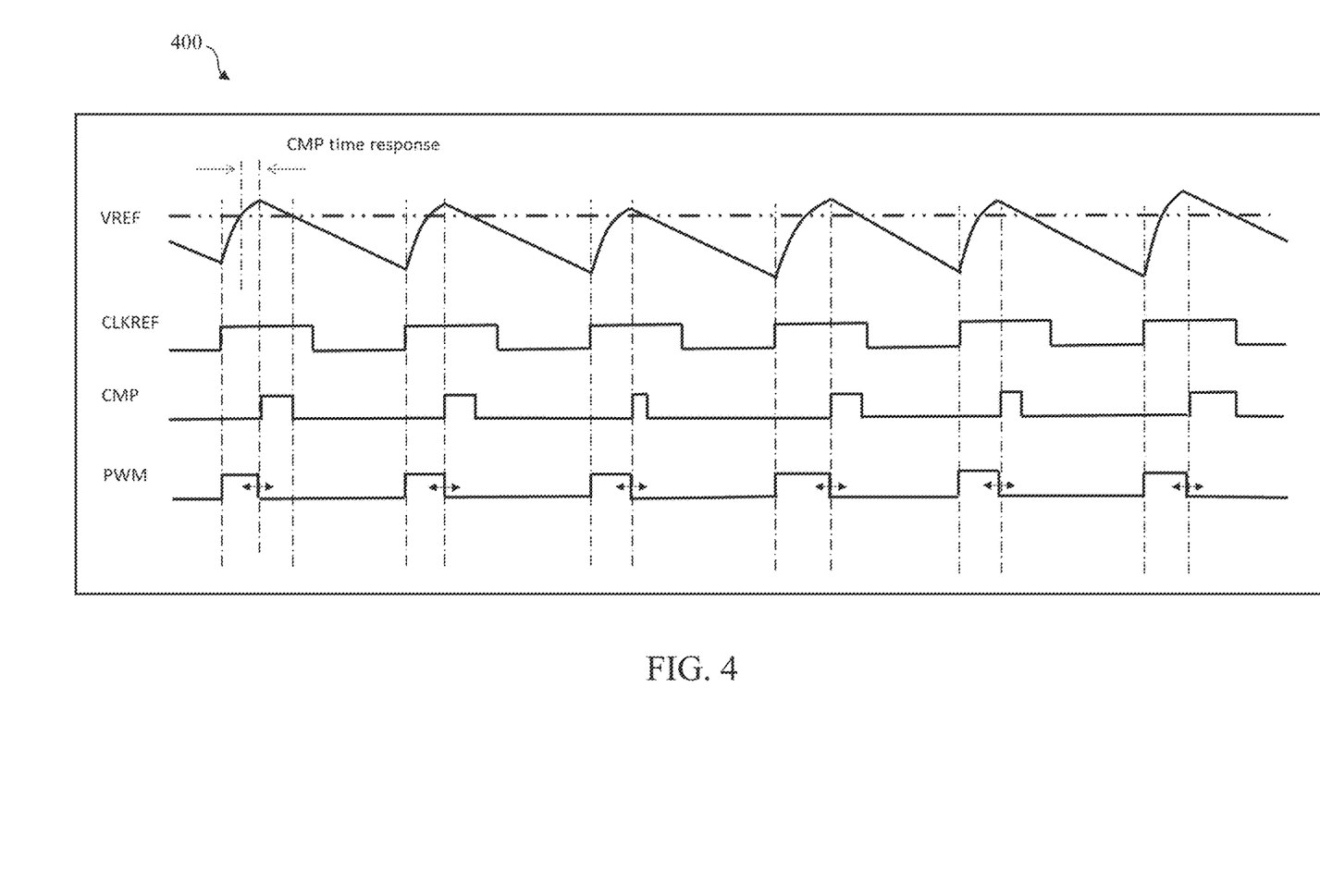
FIG. 4 shows a signal chronogram.

FIG. 4 shows a signal chronogram 400. In particular, a signal chronogram 400 is shown for the power converter 320 shown in FIG. 3C, when said power converter 320 is in operation. More specifically, it is shown that the PWM duty cycle is modulated to regulate the output voltage VOUT over the output voltage set point VREF. Its frequency is fixed by the reference clock.

Figure 5:
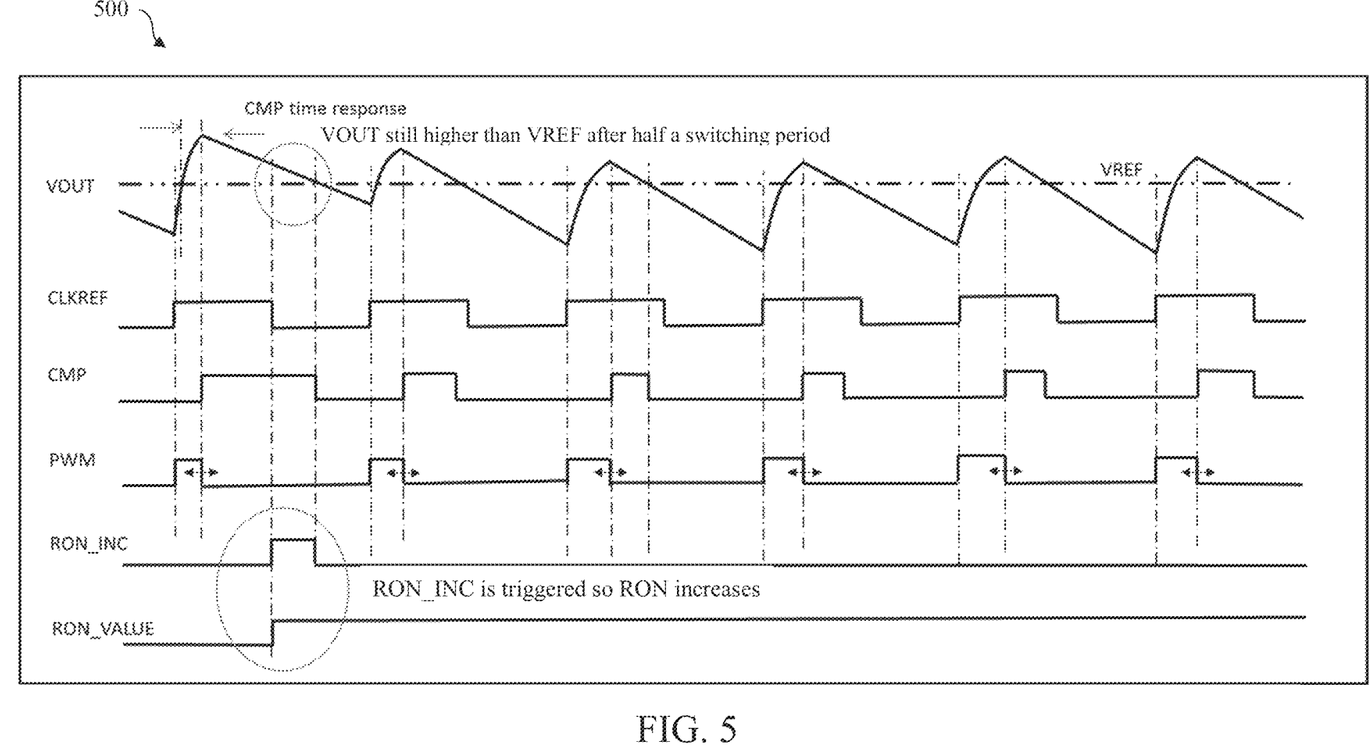
FIG. 5 shows another signal chronogram.

FIG. 5 shows another signal chronogram 500. In particular, it is shown that at a low load current, the output voltage VOUT stays higher than VREF after half a switching period. Then, the resistance of the power switches is incremented. More specifically, it is shown that RON_INC is triggered if the output voltage VOUT is still above the output voltage set point VREF after half a switching period.

Figure 6:
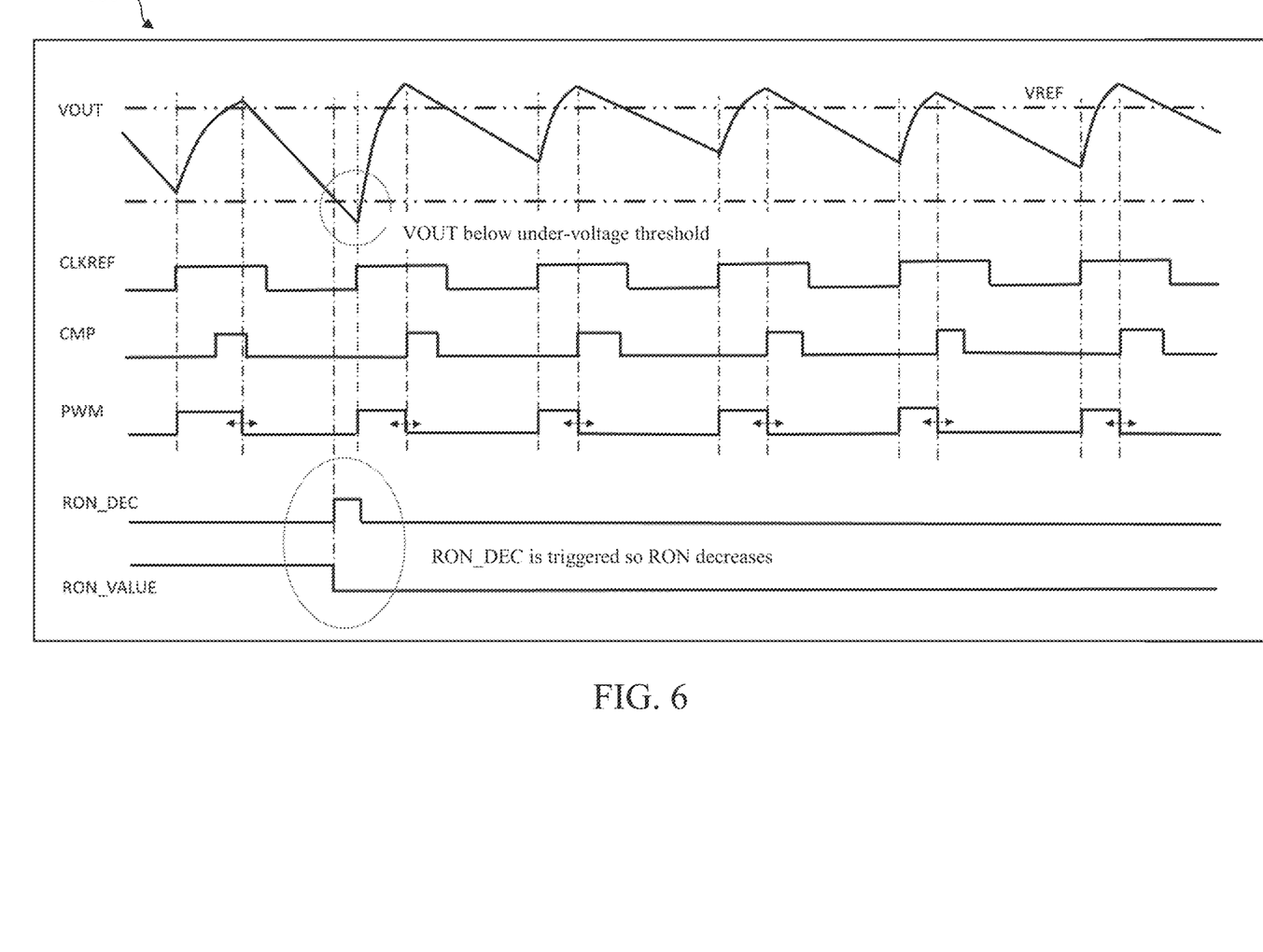
FIG. 6 shows a further signal chronogram.

FIG. 6 shows a further signal chronogram 600. In particular, it is shown that at a high load current, the output voltage VOUT drops below the under-voltage threshold voltage (VTH_UV). Then, the resistance of the power switches is decreased. More specifically, it is shown that RON_DEC is triggered if the output voltage VOUT drops below the under-voltage threshold voltage (VTH_UV).

Figure 7:
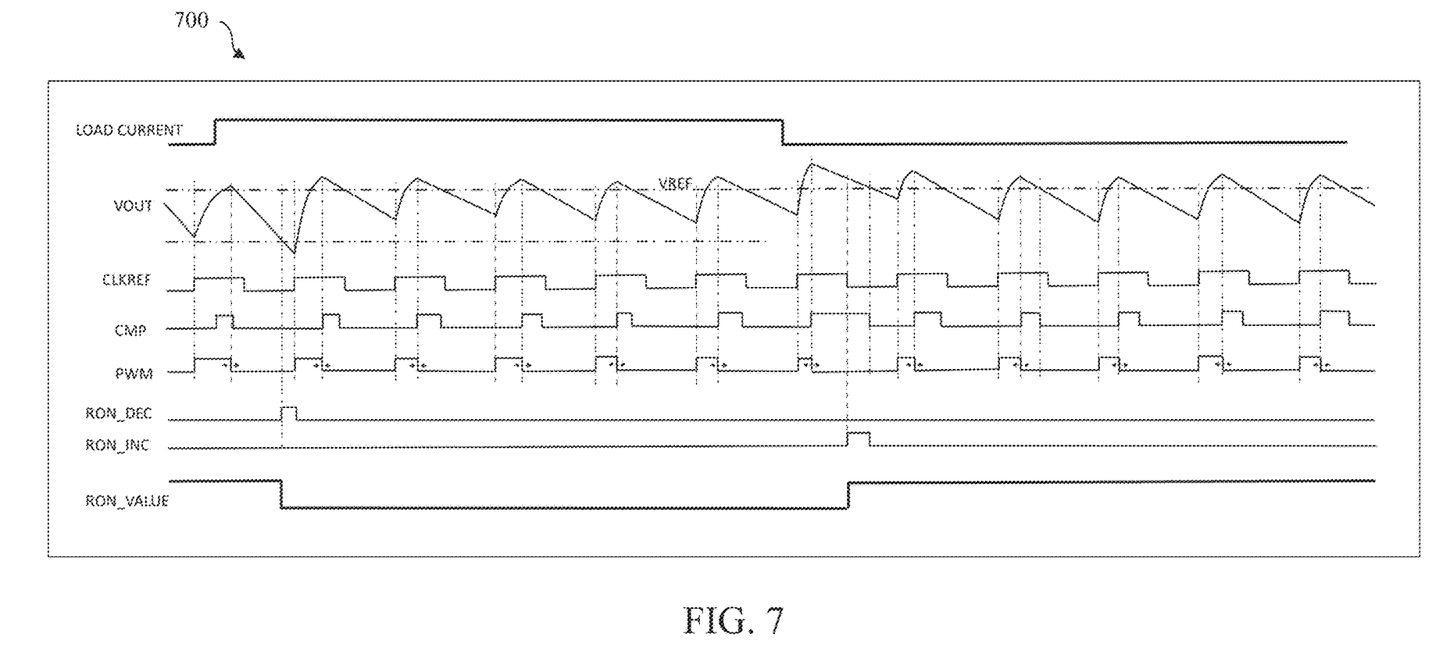
FIG. 7 shows a further signal chronogram.

FIG. 7 shows a further signal chronogram 700. In particular, the transient load regulation of a power converter of the kind set forth is shown. The output voltage VOUT is plotted versus the load current steps. The resistance RON is decreased after a load rising step as RON_DEC is triggered if the output voltage VOUT drops below the under-voltage threshold voltage. The resistance RON increases after the load falling edge, to return to the initial RON value.

Figure 8:
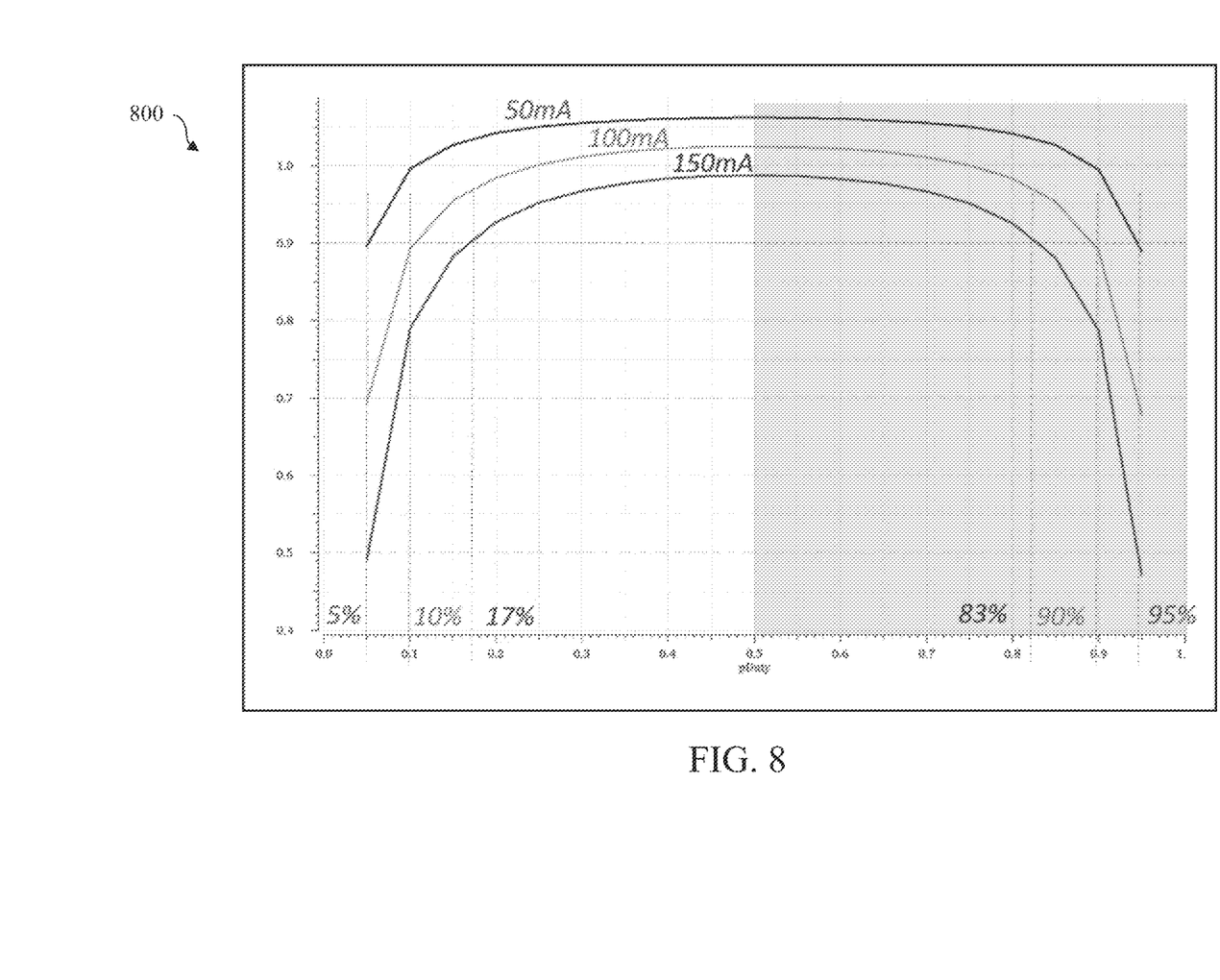
FIG. 8 shows a simulation result.

FIG. 8 shows a simulation result 800. Due to the symmetry in the topology of a power converter, two values for the PWM duty cycle are possible. FIG. 8 shows the output voltage VOUT versus the PWM duty cycle as obtained from an open loop simulation. The output voltage VOUT is plotted for 3 load currents: 50 mA, 100 mA, 150 mA. Other conditions are: VIN=2.2V; switching frequency=3.87 MHz; CSW=400 nF; COUT=1 μF; RDSON fixed at 350 mΩ, wherein RDSON is the resistance of a power switch during the on-state.

Two duty cycle set points are used at different load levels to regulate at 900 mV:
  5% and 95% duty cycles for 50 mA load;
  10% and 90% duty cycles for 100 mA load;
  17% and 83% duty cycles for 150 mA load.

Figure 9:
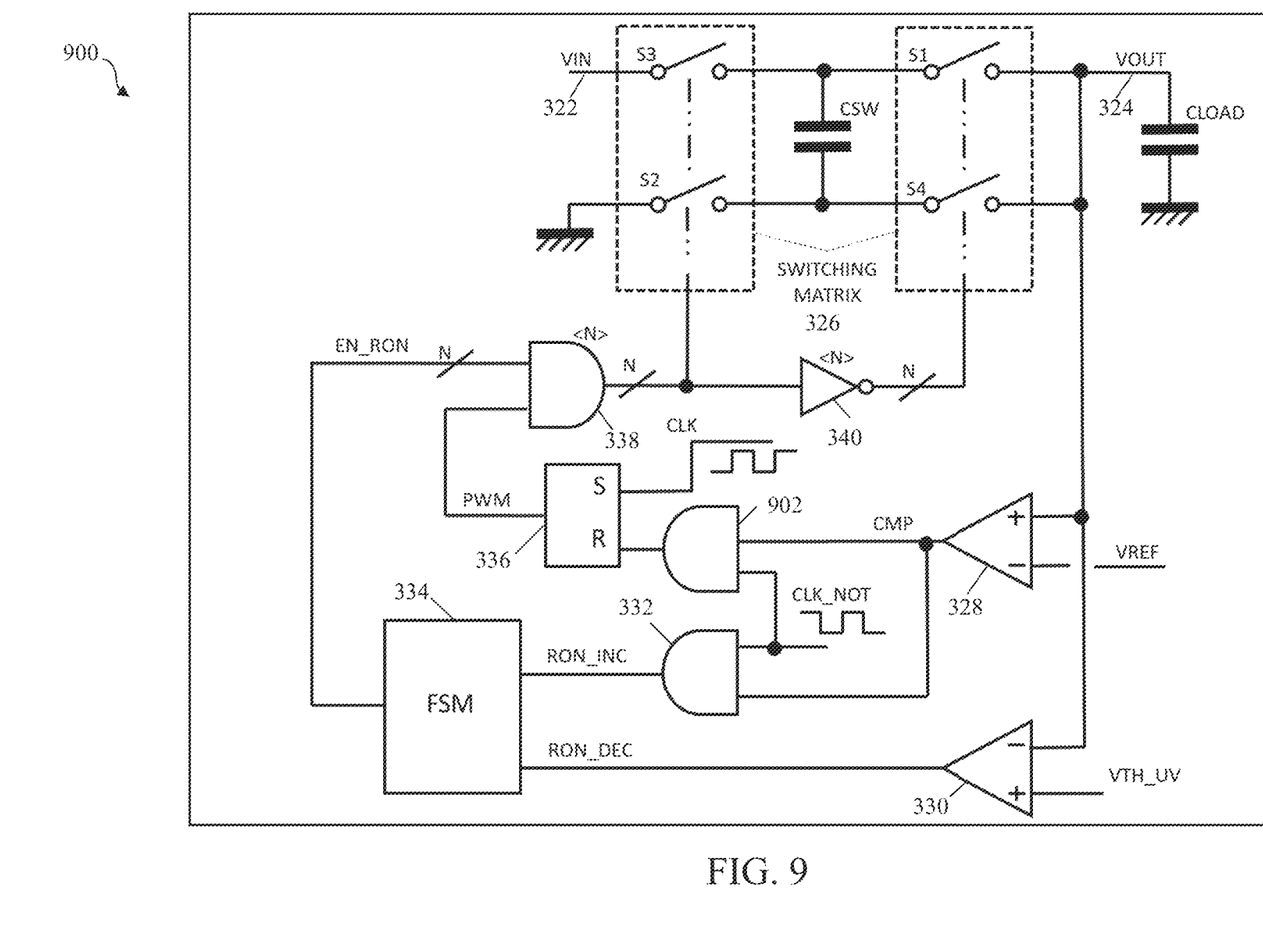
FIG. 9 shows a further illustrative embodiment of a power converter.

FIG. 9 shows a further illustrative embodiment of a power converter 900. To avoid instability of the power converter, a reset may be forced at half the period. It is noted that PWM duty cycles higher than 50% are not available to regulate the output voltage VOUT. In the power converter 900 shown in FIG. 9, an additional AND gate 902 is introduced to facilitate carrying out the reset. In a practical implementation, the system may be implemented using power switches divided in four parts: part 3 with RON=4×350 mΩ, part 2 with RON=4×350 mΩ, part 1 with RON=8×350 mΩ, part 0 with RON=16×350 mΩ. In this example, part 3 is composed of 4 switches coupled in parallel, and the on-state resistance of each switch is 1.4Ω. The division of the power switching matrix is not linear to maximize the PWM load range.

Figure 10:
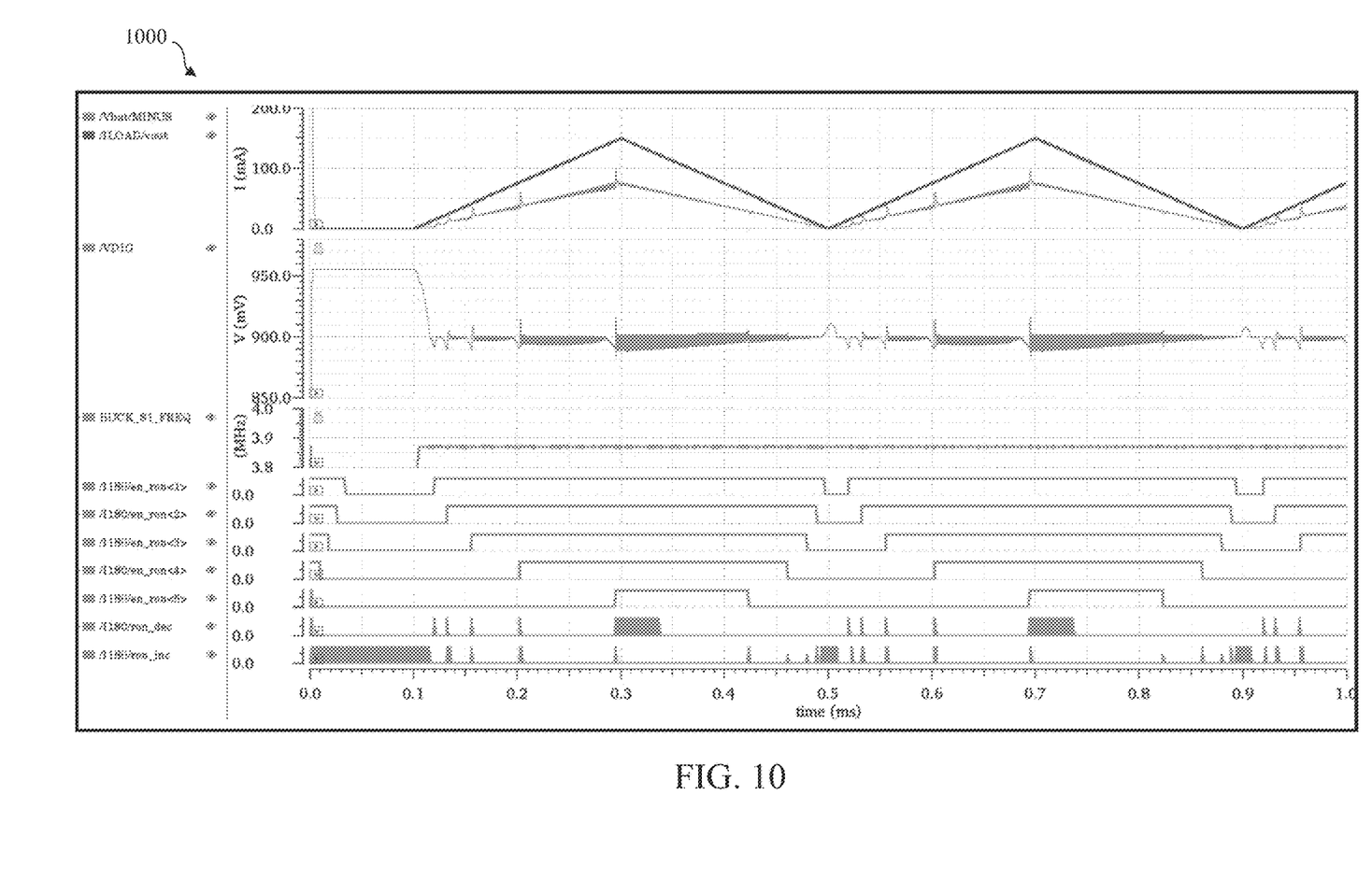
FIG. 10 shows another simulation result.

FIG. 10 shows another simulation result 1000. Ideal components have been used. The output voltage VOUT (referred to as VDIG in FIG. 10) is plotted over a transient load response (load from 0 mA to 150 mA with 200 us slope). Other Conditions are: VIN=2.2V; VOUT=900 mV; switching frequency=3.87 MHz; CFLY=400 nF; COUT=1 uF; maximum RDSON fixed at 350 mΩ, VTH_UV=890 mV. In this example, the maximum RDSON is the maximum RDSON under different process-voltage-temperature (PVT) conditions. In addition to LOAD and VOUT, eight other internal signals are plotted to illustrate the behavior of the power converter:
  CLKPWM: PWM switching frequency
  BUCK_PWM_FREQUENCY: switching frequency extracted on PWM clock
  EN_RON<5:1>: enable for each part (note: part 0 is always on)
  RON_DEC: RON decrease
  RON_INC: RON increase
  load current and current consumption It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 power converter
102 input
104 output
106 power switching block
108 comparator
110 AND gate
112 inverter
200 signal chronogram
300 power converter
302 power switching block
304 input
306 output
308 controller
310 method of operating a power converter
312 receiving an input voltage on the input
314 providing an output voltage on the output
316 controlling the power switching block by alternately closing switches in the power switching block
318 controlling a resistance of the power switching block
320 power converter
322 input
324 output
326 power switching matrix
330 comparator
332 AND gate
334 finite state machine
336 set-reset gate
338 AND gate
340 inverter
400 signal chronogram
500 signal chronogram
600 signal chronogram
700 signal chronogram
800 simulation result
900 power converter
1000 simulation result

The invention claimed is:

1. A power converter comprising:
an input configured to receive an input voltage;
an output configured to provide an output voltage;
a power switching block coupled between the input and the output;
a controller comprising:
a comparator coupled to compare the output voltage with a reference voltage to generate a comparison result;
a first logic circuit coupled to receive a clock signal having a fixed frequency and the comparison result, and to provide a pulse width modulation signal having the fixed frequency;
a power switch resistance circuit configured to provide a resistance control signal for controlling a resistance of the power switching block in response to detecting changes in the output voltage; and
a second logic circuit having a first input for receiving the pulse width modulation signal, a second input for receiving the resistance control signal, and an output for providing a switch control signal to the open and close switches of the power switching block at the fixed frequency, wherein the second logic circuit comprises an AND logic function.

2. The power converter of claim 1, wherein the power switching block comprises a plurality of switches connected in parallel, and wherein the controller is configured to control said resistance by controlling how many of the plurality of switches are in an on-state resistance.

3. The power converter of claim 1, wherein the controller is configured to increase the resistance if a load on the output is low and to decrease the resistance if the load on the output is high.

4. The power converter of claim 3, wherein the controller is configured to determine that the load on the output is low by determining that the output voltage exceeds a high threshold and to determine that the load on the output is high by determining that the output voltage falls below a low threshold.

5. The power converter of claim 1, wherein the first logic circuit comprises a set-reset gate configured to provide the pulse width modulation signal.

6. The power converter of claim 1, wherein the controller is configured to initiate an increase of the resistance if the output voltage exceeds a targeted set point after half a switching period.

7. A near field communication device comprising the power converter of claim 1.

8. The near field communication device of claim 7, wherein the power converter is configured to provide the output voltage to a secure element comprised in the near field communication device.

9. The near field communication device of claim 7, further comprising a front-end circuit configured to provide the input voltage.

10. The power converter of claim 1, wherein the power switch resistance circuit comprises a finite state machine configured to open and close the switches in response to detecting the changes in the output voltage.

11. A method of operating a power converter, the power converter comprising an input, an output, a controller and a power switching block coupled between the input and the output, the method comprising:

receiving an input voltage on the input;

providing an output voltage on the output;

comparing the output voltage with a reference voltage to generate a comparison result;

receiving, by a first logic circuit, a clock signal having a fixed frequency and the comparison result, and to provide a pulse width modulation signal having the fixed frequency;

providing, by a power switch resistance circuit, a resistance control signal for controlling a resistance of the power switching block in response to detecting changes in the output voltage; and receiving the pulse width modulation signal at a first input of a second logic circuit, and receiving a resistance control signal at a second input of the second logic circuit, and providing at an output of the second logic circuit a switch control signal to open and close switches of the power switching block at the fixed frequency, wherein the controller initiates an increase of the resistance if the output voltage exceeds a targeted set point after half a switching period.

12. The method of claim 11, wherein said resistance is controlled by controlling an on-state resistance of a plurality of switches connected in parallel comprised in the power switching block.

13. The method of claim 11, wherein the controller increases the resistance if a load on the output is low and decreases the resistance if the load on the output is high.

14. The method of claim 13, wherein the controller determines that the load on the output is low by determining that the output voltage exceeds a high threshold and determines that the load on the output is high by determining that the output voltage falls below a low threshold.

15. The method of claim 11, wherein the power switch resistance circuit comprises a finite state machine to open and close the switches in response to detecting the changes in the output voltage.

16. The method of claim 11, wherein the second logic circuit comprises an AND logic function.

17. The method of claim 16, wherein the first logic circuit comprises a set-reset gate configured to provide the pulse width modulation signal.

18. The method of claim 11, wherein the method is implemented using a non-transitory machine-readable medium comprising executable instructions that, when executed, carry out or control the method.

* * * * *